United States Patent
Kwon

(10) Patent No.: US 10,120,362 B2
(45) Date of Patent: Nov. 6, 2018

(54) OUTPUT ADJUSTMENT DEVICE OF ANALOG OUTPUT MODULE

(71) Applicant: LSIS CO., LTD., Gyeonggi-do (KR)

(72) Inventor: Jae-il Kwon, Gyeonggi-do (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 236 days.

(21) Appl. No.: 15/170,804

(22) Filed: Jun. 1, 2016

(65) Prior Publication Data

US 2016/0357167 A1 Dec. 8, 2016

(30) Foreign Application Priority Data

Jun. 2, 2015 (KR) .................. 10-2015-0077698

(51) Int. Cl.
  *H03M 1/00* (2006.01)
  *G05B 19/05* (2006.01)

(52) U.S. Cl.
  CPC .... *G05B 19/054* (2013.01); *G05B 2219/1158* (2013.01)

(58) Field of Classification Search
  CPC .......... G05B 19/054; G05B 2219/1158; G05B 19/05; H03M 1/00; H03M 1/18; H03M 1/66; H03M 1/747
  USPC ................................. 341/139, 144
  See application file for complete search history.

(56) References Cited

U.S. PATENT DOCUMENTS

| 5,515,048 A * | 5/1996 | Honda ................ H03M 1/0827 341/55 |
| 5,751,601 A * | 5/1998 | Tang ........................ B41J 2/315 347/177 |
| 6,900,743 B1 * | 5/2005 | Volz .................... G01R 31/2829 324/72.5 |
| 6,927,720 B2 | 8/2005 | Matsumoto |
| 7,162,230 B2 | 1/2007 | Inokoshi et al. |
| 8,564,466 B2 | 10/2013 | Hoshikawa et al. |
| 2003/0211832 A1 * | 11/2003 | Inokoshi ................ A63H 30/04 455/73 |
| 2008/0139957 A1 * | 6/2008 | Hubbard ................ A61B 5/053 600/547 |
| 2012/0088612 A1 * | 4/2012 | Johnson ............. A63B 69/3632 473/422 |
| 2015/0214728 A1 | 7/2015 | Kwon |

FOREIGN PATENT DOCUMENTS

| CN | 1200482 A | 12/1998 |
| CN | 101750582 A | 6/2010 |
| CN | 101893868 A | 11/2010 |

(Continued)

OTHER PUBLICATIONS

Chinese Office Action for related Chinese Application No. 201610366114.7; action dated May 2, 2018; (6 pages).

*Primary Examiner* — Jean B Jeanglaude
(74) *Attorney, Agent, or Firm* — K&L Gates LLP

(57) ABSTRACT

An output adjustment device of an analog output module may include: a microprocessor unit (MPU) performing an arithmetic operation on a digital signal, an analog output module including an analog signal output unit receiving a signal output from the MPU to output an analog signal, and an output signal adjustment unit outputting a control signal for controlling a magnitude or amplitude of the output analog signal to the MPU.

6 Claims, 4 Drawing Sheets

(56) References Cited

FOREIGN PATENT DOCUMENTS

| | | | |
|---|---|---|---|
| CN | 103039007 | A | 4/2013 |
| CN | 204711999 | U | 10/2015 |
| JP | 4270998 | B1 | 6/2009 |
| JP | 4902824 | B1 | 3/2012 |
| KR | 10-1998-035188 | A | 8/1998 |
| KR | 2009-0001506 | A | 1/2009 |
| KR | 2010-0125723 | A | 12/2010 |
| KR | 101536119 | B1 | 7/2012 |
| KR | 2015-0089181 | A | 8/2015 |

\* cited by examiner ( PRIOR ART)

OUTPUT ADJUSTMENT DEVICE OF ANALOG OUTPUT MODULE

CROSS REFERENCE TO RELATED APPLICATIONS

This application claims the benefit of Korean Patent Application No. 10-2015-0077698, filed on Jun. 2, 2015, entitled "OUTPUT ADJUSTMENT DEVICE OF ANALOG OUTPUT MODULE", which is hereby incorporated by reference in its entirety.

BACKGROUND

Technical Field

The present disclosure relates to an analog output module for outputting an analog signal, and more particularly, to an output adjustment device of an analog output module so as to verify a normal operation thereof for use in a programmable logic controller (hereinafter, referred to as a PLC).

Description of the Related Art

In typical industrial sites, automatic facilities have been comprised of mechanical equipment using a relay and the like. For changing functions of the automatic facilities comprised of the mechanical equipment, there may be difficulty in revising wirings of an internal circuit in each of the equipment. To address such a difficulty, a PLC has been made.

A PLC is a programmable logic controller. Generally, the PLC serves as a computer, and receives a signal from a machine and processes the signal according to an internally programmed procedure to output the processed signal back to the machine. The PLC replaces functions of a control instrument such as a relay, a timer, a counter, and the like with a semiconductor device such as an integrated device, a transistor, and the like, and may be program-controlled by adding a numerical calculation function to a basic sequence control function. Additionally, the PLC performs a predetermined logic according to a pre-stored program in an internal memory thereof. The PLC may be applicable to various works such as equipment control, a numeric setting of equipment, a time control, a real time monitoring, a real time data collecting, an operating of safety equipment, and the like.

The PLC is provided with an analog output module for providing a signal to a machine of an automatic facility and the like, and an analog input module for receiving a signal from the machine. The analog input module converts an analog signal provided from a machine into a digital signal to provide an internal arithmetic operation unit with the converted digital signal. The analog output module receives a digital signal reflecting an arithmetic operation result provided from the arithmetic operation unit and converts the received digital signal into an analog signal to transmit the converted analog signal to the machine. At this point, the analog output module converts a digital signal output from a micro processing unit (MPU) into an analog signal to output the converted analog signal to an external load device.

The PLC is a general-purpose controller used in industrial sites and an external load system has a variety of forms. When various load systems are conducted a trial run, a wiring error or a malfunction of a load device may occur such that there is a need to implement a system to be maintainable rapidly.

To output analog voltage and current, a typical analog module for a PLC is directly programmed by a user using a debugging tool such as a programming and debugging tool (PADT). In addition, a method of connecting to a PLC and downloading a program may be used, or high-priced simulation equipment may be installed and used. Even though the high-priced simulation equipment is installed, this equipment is required for each of output channels such that an installation cost may be increased by n times. Moreover, a separate transportation for configuring simulation equipment is required such that there is difficulty in a rapid maintenance.

SUMMARY

Therefore, to address the problems described above, an object of some embodiments of the present disclosure is to provide an output adjustment device of an analog output module capable of simply controlling an output signal of an analog output module for a PLC.

Also, another object of some embodiments of the present disclosure is to provide an output adjustment device of an analog output module capable of rapidly performing a maintenance responding to a wiring error of a PLC system and a malfunction of a load device.

In accordance with one embodiment of the present disclosure, an output adjustment device of an analog output module may include a microprocessor unit (MPU) configured to perform an arithmetic operation on a digital signal, an analog output module including an analog signal output unit configured to receive a signal output from the MPU to output an analog signal, and an output signal adjustment unit configured to output a control signal for controlling a magnitude or amplitude of the output analog signal to the MPU.

The MPU may include an analog-to-digital (AD) converter configured to convert the control signal output from the output signal adjustment unit into a digital signal.

A switch configured to control a turn-on/off of the AD converter may be further included. The output signal adjustment unit may be a potentiometer of which a resistance value is varied according the control signal.

The potentiometer may include a variable resistor and may output a voltage signal divided in voltage by the variable resistor as the control signal.

The analog signal output unit may include a digital-to-analog (DA) converter configured to receive the signal output from the MPU to convert the received signal into the analog signal, a voltage amplifying unit configured to amplify and output a voltage received from the DA converter, and a current amplifying unit configured to amplify and output a current received from the DA converter.

The analog signal output unit may further include a photo-coupler configured to insulate an analog circuit unit including the DA converter, the voltage amplifying unit, and the current amplifying unit from the MPU.

In accordance with the embodiment of the present disclosure, a simplified adjustment device attached to the analog output module may be controlled such that a magnitude or amplitude of an output of the analog output module may be easily controlled.

Therefore, while a configuration and a performance of an analog output circuit is absolutely maintained in an analog output module for use in a PLC, a rapid maintenance may be possible to respond to a wiring error of a PLC system or a malfunction of load equipment such that a transportation causing an additional cost for the user may be decreased and stability of a system may be increased.

In addition, an output system may be configured as a general-purpose controller in a form suitable for a variety of analog load systems. And, the user may conduct a trial run without programming a separate complicated trial run program or using separate simulation equipment, such that a system implementation cost may be reduced.

DETAILED DESCRIPTION

Hereinafter, illustrative embodiments of the present disclosure will be described in detail in association with the accompanying drawings. However, the spirit of the present disclosure is not limited to these illustrative embodiments, and other regressive disclosure or other embodiments without departing from the spirit of the present disclosure may be easily proposed by adding, modifying, and eliminating another component.

Although the terms used herein are selected from general terms being used currently and widely, Applicant arbitrarily selects terms in a specific case. In such a case, meanings of the terms selected by Applicant are described in a corresponding description. Therefore, it should be noted that some embodiments of the present disclosure may be construed as the meanings of the terms not the appellation thereof.

That is, in the following description, the terms of 'comprise' and/or 'include' do not preclude the presence of stated components, other components, or Operations.

Figure 1:
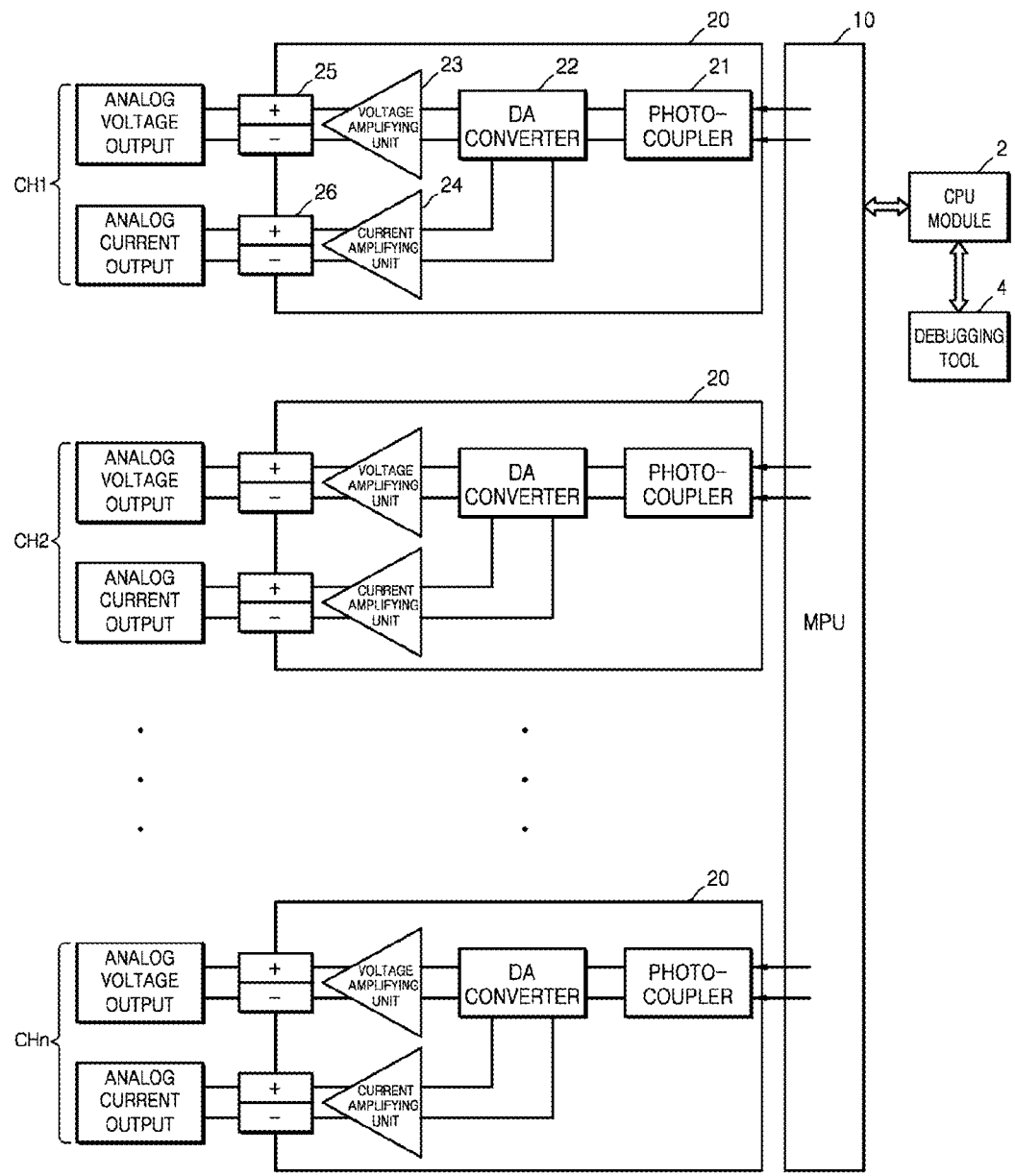
FIG. 1 is a block diagram illustrating a configuration of a conventional analog output module, according to prior art.

FIG. 1 is a block diagram of a typical analog output module. As shown in FIG. 1, the analog output module is provided with a microprocessor unit (herein referred to as an MPU) 10, and a plurality of analog output circuits 20. The analog output circuits have the same configuration to each other such that one reference numeral is given thereto. Each of the analog output circuits 20 outputs an analog voltage output signal and an analog current output signal so as to drive external equipment through corresponding output terminals.

The MPU 10 performs an arithmetic operation on a digital signal input from a central processing unit (CPU) module 2, and provides the analog output circuit 20 with a digital signal corresponding to the arithmetic operation result. The CPU module 2 including a configuration to be mountable on a programmable logic controller (PLC) receives data from a PLC debugging tool 4 and executes a program being programmed by a user in the PLC debugging tool 4 to compute a digital output value to be transmitted to an analog output module. The PLC debugging tool 4 is a device for enabling the user to program and debug a PLC, may be installable on a computer such as a personal computer (PC) and may generally employ a programming and debugging tool (PADT).

The analog output circuit 20 is provided with a photo-coupler 21, a digital-to-analog (DA) converter 22, a voltage amplifying unit 23, a current amplifying unit 24, a voltage signal output terminal 25, and a current signal output terminal 26.

The photo-coupler 21 receives and transmits a signal provided from the MPU 10 to the DA converter 22. In addition, the photo-coupler 21 serves to insulate the MPU 10 from an analog circuit unit including the DA converter 22, the voltage amplifying unit 23, and the current amplifying unit 24.

The DA converter 22 converts a digital signal transmitted through the photo-coupler 21 into an analog signal.

The voltage amplifying unit 23 amplifies and outputs a voltage signal provided from the DA converter 22 to the corresponding voltage signal output terminal 25, and the current amplifying unit 24 amplifies and outputs a current signal provided from the DA converter 22 to the corresponding current signal output terminal 26.

With such a configuration, when the analog output module is conducted a trial run, a program should be directly programmed by the user through the debugging tool 4 so as to inspecting a wiring of an analog voltage and an analog current and verifying a normal operation of an external load system, such that it may be a time consuming work. Therefore, there is a need to develop a device capable of simply inspecting an output current and an output voltage.

Figure 2:
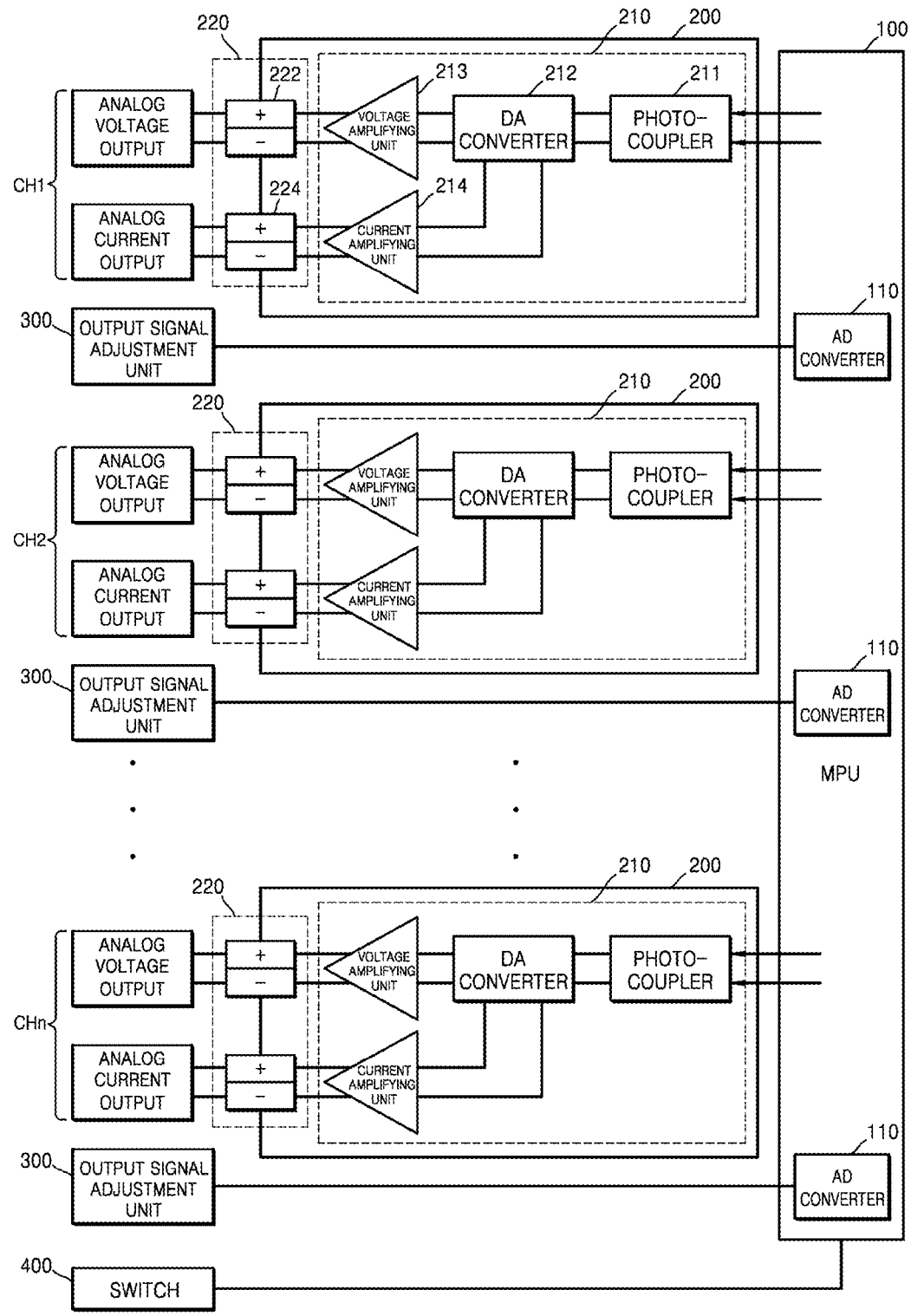
FIG. 2 is a block diagram illustrating a configuration of an output adjustment device of an analog output module according to one embodiment of the present disclosure.

FIG. 2 is a block diagram illustrating an output adjustment device of an analog output module according to one embodiment of the present disclosure. As shown in FIG. 2, the output adjustment device of the analog output module may include an MPU 100, an analog signal output unit 200, an output signal adjustment unit 300, and a switch 400. In addition to the aforementioned, a CPU module and a debugging tool may be further included. The CPU module and the debugging tool, however, are the same as shown in FIG. 1, so that a detailed description thereof will be omitted. The MPU 100 and the analog signal output unit 200 are a configuration of the analog output module, and the output signal adjustment unit 300 and the switch 400 may be installed in isolation with the analog output module.

As described above, the MPU 100 receives a digital signal provided from the CPU module and generates a digital signal for controlling an operation of external load equipment (not shown). Additionally, the MPU 100 includes an analog-to-digital (AD) converter 110 for converting an analog signal input from the output signal adjustment unit 300 into a digital signal.

The analog signal output unit 200 includes a signal transmit unit 210 and an output terminal 220.

The signal transmit unit 210 includes a photo-coupler 211 so as to insulate an analog circuit unit including a DA converter 212, a voltage amplifying unit 213, and a current amplifying unit 214 from the MPU 100 outputting a digital signal.

A digital signal provided from the MPU 100 is converted into an analog signal in the DA converter 212 via the photo-coupler 211, and the converted analog signal is amplified in the voltage amplifying unit 213 and the current amplifying unit 214 to be output. The voltage amplifying unit 213 amplifies a voltage signal provided from the DA converter 212 to provide the amplified voltage signal as a first signal, and the current amplifying unit 214 amplifies a current signal provided from the DA converter 212 to provide the amplified current signal as a second signal. The voltage amplifying unit 213 and the current amplifying unit 214 are configured using an operational amplifier (OP-AMP) so as to amplify the voltage signal and the current signal, respectively.

The output terminal 220 includes a voltage output terminal 222 for outputting the voltage signal provided from the voltage amplifying unit 213, and a current output terminal 224 for outputting the current signal provided from the current amplifying unit 214.

The output signal adjustment unit 300 is to adjust a magnitude or amplitude of an output signal output from the output terminal 220, and may be installed at an external side of the analog output module to be operable by the user. The output signal adjustment unit 300 may be comprised of a potentiometer which has a three terminal shape and whose resistance value is varied according to a control signal. The potentiometer varies a resistance value according to a manipulation of the user to output an output control signal capable of adjusting a magnitude or amplitude of an output signal. In other words, a voltage signal divided in voltage by a variable resistor of the potentiometer is output as an output control signal.

The switch 400 is a switch arranged at an external side of an output signal module to enable the user to manipulate a trial run selection. In other words, the user may adjust an output signal not only through a manipulation of the output signal adjustment unit 300 but also using a debugging tool as prior art, through a manipulation of the switch 400.

With such a configuration, when the user adjusts the output signal adjustment unit 300 while maintaining the switch 400 in a turn-on state, a signal is converted into a corresponding digital signal in the AD converter 110 to be output through the signal transmit unit 210 and the output terminal 220.

Figure 3:
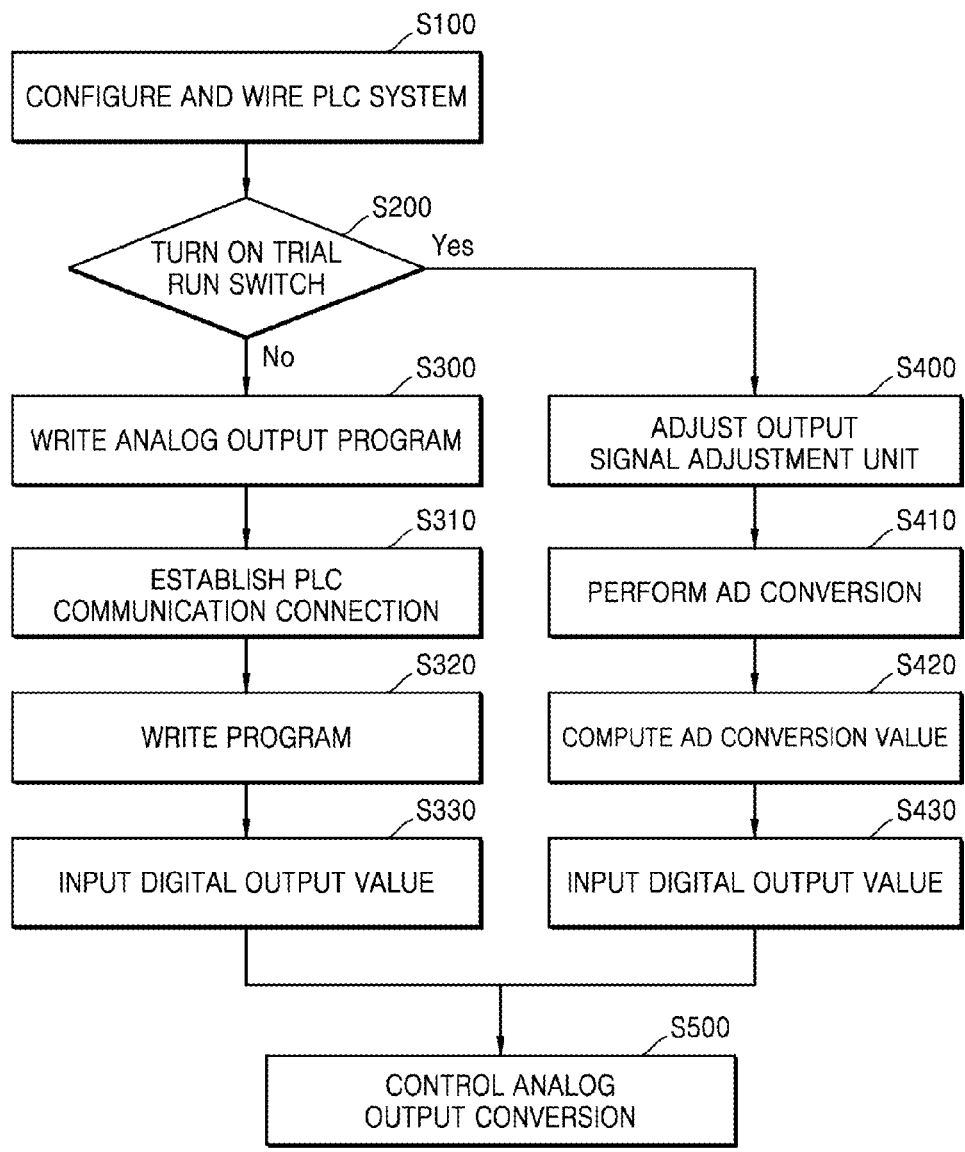
FIG. 3 is a flowchart illustrating an output adjustment method of the analog output module according to one embodiment of the present disclosure.

FIG. 3 is a flowchart illustrating an output signal adjustment method according to one embodiment of the present disclosure.

With reference to FIG. 3, the user firstly configures a PLC system and wires a voltage or current output set to an analog output load so as to conduct a trial run in Operation S100.

After the wiring is completed, a turn-on/off of the trial run switch 400 is verified in Operation S200. A turn-on/off of the switch may be selected by the user. If the switch is turned off, by using a debugging tool as prior art, an analog output program is programmed in Operation S300, a communication connection is established between a PLC and the debugging tool in Operation S310, a program made through the debugging tool is downloaded to the PLC in Operation S320. In other words, a program writing is performed. After the downloading is completed, a digital output value, which has been output, is input into the analog output module in Operation S330.

On the other hand, if the switch is turned on, the user adjusts the output signal adjustment unit 300 in Operation 400. In other words, the user adjusts a resistance value of the potentiometer. After the adjusting is completed, the output signal adjustment unit 300 outputs a voltage value divided in voltage by the variable resistor as an output control signal, and the output control signal is converted into a digital signal through the AD converter 110 in Operation S410. The converted digital signal is computed so as to be suitable to control an operation of external load equipment in Operation S420. Such a computation process may be performed in the MPU, and this is a technique well known in the related art such that a detailed description thereof will be omitted. The computed digital signal is again transmitted to the DA converter in Operation S430.

When the digital signal is transmitted, the analog output module begins a conversion control in Operation S500.

Figure 4:
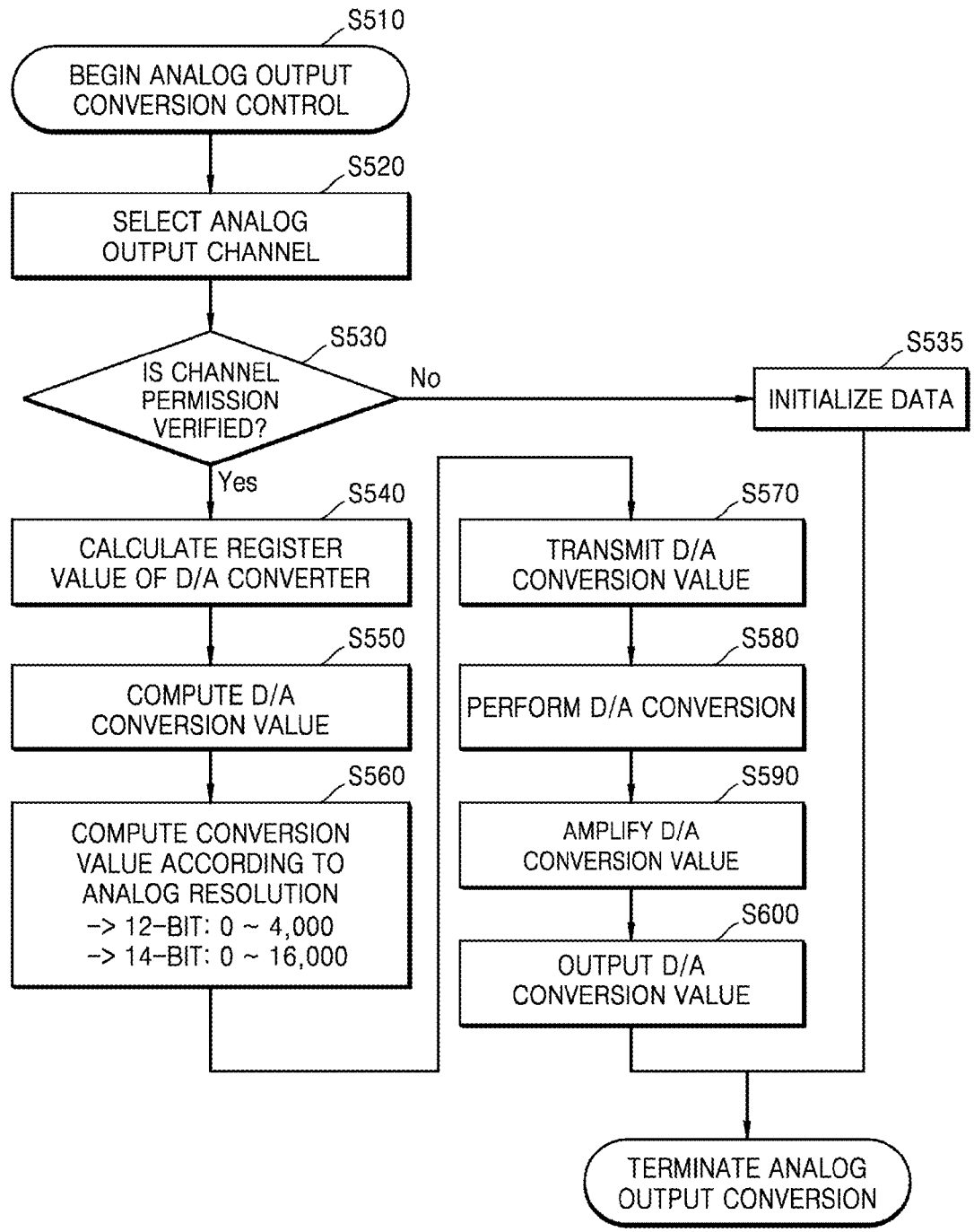
FIG. 4 is a flowchart illustrating an internal operation process of the analog output module according to one embodiment of the present disclosure.

A process after Operation S500 is performed inside the analog output module. FIG. 4 illustrates an internal process of the analog output module.

After an analog output channel set by the user is selected and a set value is initialized, a conversion permission setting per analog output channel is verified in Operations S510 to S530. If a channel conversion is prohibited based on the verification result, data is initialized in Operation S535. Otherwise, if the channel conversion is permitted, a register set value required for performing a digital-to-analog conversion in a DA converter is calculated in Operation S540 and a digital value to be actually output is computed in Operation S550.

Thereafter, a conversion value according to an analog resolution is computed in Operation S560. For example, a conversion value is computed in the range of 0 to 4,000 if the analog resolution is a 12-bit, or in the range of 0 to 16,000 if the analog resolution is a 14-bit. The computed digital value is transmitted to the DA converter through a photo-coupler in Operation S570. The digital signal transmitted to the DA converter is converted into an analog signal therein, amplified through a signal amplifier, and then transmitted to the external load equipment in Operations S580 to S600, such that an analog output conversion is completed. Therefore, in accordance with the embodiment of the present disclosure, a simplified adjustment device attached to the analog output module may be controlled such that a magnitude or amplitude of an output of the analog output module may be easily controlled.

Consequently, while a configuration and a performance of an analog output circuit is absolutely maintained in an analog output module for use in a PLC, a rapid maintenance may be possible to respond to a wiring error of a PLC system or a malfunction of load equipment such that a transportation causing an additional cost for the user may be decreased and stability of a system may be increased.

In addition, an output system may be configured as a general-purpose controller in a form suitable for a variety of analog load systems. And, the user may conduct a trial run without programming a separate complicated trial run program or using separate simulation equipment, such that a system implementation cost may be reduced.

Embodiments disclosed herein and the accompanying drawings, therefore, are not to be taken in a sense for limiting the technical concept of the present disclosure but for explanation thereof, and the range of the technical concept is not limited to these embodiment and the accompanying drawings. The scope of the present disclosure should be construed by the appended claims, along with the full range of equivalents to which such claims are entitled.

What is claimed is:

1. An output adjustment device of an analog output module for use in a programmable logic controller, configured to output an analog signal to an external side, the device comprising:
   a microprocessor unit (MPU) configured to perform an arithmetic operation on a digital signal;
   an analog output module including an analog signal output unit configured to receive a signal output from the MPU to output an analog signal; and
   an output signal adjustment unit configured to regulate a magnitude or amplitude of the output analog signal to output a control signal for a trial run of the output analog signal to the MPU, wherein the MPU includes an analog-to-digital (AD) converter configured to convert the control signal output from the output signal adjustment unit into a digital signal.

2. The output adjustment device of claim 1, further comprising:
   a switch configured to control a turn-on/off of the AD converter.

3. The output adjustment device of claim 1, wherein the output signal adjustment unit is a potentiometer configured to vary a resistance value according the control signal.

4. The output adjustment device of claim 3, wherein the potentiometer includes a variable resistor and is configured to output a voltage signal divided in voltage by the variable resistor as the control signal.

5. The output adjustment device of claim 1, wherein the analog signal output unit includes:
   a digital-to-analog (DA) converter configured to receive the signal output from the MPU to convert the received signal into the analog signal;
   a voltage amplifying unit configured to amplify and output a voltage received from the DA converter; and
   a current amplifying unit configured to amplify and output a current received from the DA converter.

6. The output adjustment device of claim 5, wherein the analog signal output unit further includes:
   a photo-coupler configured to insulate an analog circuit unit including the DA converter, the voltage amplifying unit, and the current amplifying unit from the MPU.

\* \* \* \* \*